United States Patent
Söderlund et al.

(10) Patent No.: US 10,991,017 B2
(45) Date of Patent: Apr. 27, 2021

(54) METHODS AND SYSTEMS FOR PROVISIONING OF CUSTOMER PRODUCT

(71) Applicant: Telefonaktiebolaget LM Ericsson (publ), Stockholm (SE)

(72) Inventors: Magnus Söderlund, Lyckeby (SE); Elisabeth Adelgren, Hagby (SE); Peter Skarphagen, Lyckeby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 139 days.

(21) Appl. No.: 16/095,295

(22) PCT Filed: Apr. 21, 2016

(86) PCT No.: PCT/EP2016/058926
§ 371 (c)(1),
(2) Date: Oct. 19, 2018

(87) PCT Pub. No.: WO2017/182085
PCT Pub. Date: Oct. 26, 2017

(65) Prior Publication Data
US 2019/0147518 A1 May 16, 2019

(51) Int. Cl.
*G06Q 30/06* (2012.01)
*G06F 16/23* (2019.01)
(Continued)

(52) U.S. Cl.
CPC ......... *G06Q 30/0603* (2013.01); *G06F 16/21* (2019.01); *G06F 16/23* (2019.01); *H04M 15/66* (2013.01); *H04W 4/50* (2018.02)

(58) Field of Classification Search
CPC ..... G06Q 30/06; G06Q 30/0601–0643; G06Q 30/08; G06Q 30/0603; G06Q 30/0621;
(Continued)

(56) References Cited

U.S. PATENT DOCUMENTS

2004/0009764 A1* 1/2004 Hazard ................. H04L 63/12
455/418
2006/0190339 A1* 8/2006 Wan ..................... G06Q 20/203
705/22
(Continued)

OTHER PUBLICATIONS

An overview of Dynamic Software Product Line architectures andtechniques: Observations from research and industryRafael Capillaa,*, Jan Boschb, Pablo Trinidadc, Antonio Ruiz-Cortesc, Mike Hinchey. The Journal of Systems and Software. 2014. (Year: 2014).*

(Continued)

*Primary Examiner* — William J Allen
(74) *Attorney, Agent, or Firm* — Sage Patent Group

(57) ABSTRACT

A method for product provisioning includes: evaluating each entity of a product based on one or more criteria to determine if the product can be populated in a database as a globally updateable product; if the product has been determined to be eligible for being populated in the database as a globally updateable product then performing the following steps: determining, for each entity of the product, eligibility for the entity to be a global entity; generating a global entity instance for each eligible entity of the product; saving the global entity instance for each eligible entity of the product; generating a default entity instance for each ineligible entity; saving each default entity instance in the database; and if the product has been determined to be ineligible for being populated in the database as a globally updateable product then instantiating and populating the product in the database as a local product.

16 Claims, 14 Drawing Sheets

(51) Int. Cl.
*G06F 16/21* (2019.01)
*H04M 15/00* (2006.01)
*H04W 4/50* (2018.01)

(58) Field of Classification Search
CPC ....... G06F 16/30–328; G06F 16/20–29; G06F 16/21; G06F 16/23; H04M 15/66; H04W 4/50
See application file for complete search history.

(56) References Cited

U.S. PATENT DOCUMENTS

| | | | | |
|---|---|---|---|---|
| 2010/0023425 | A1* | 1/2010 | Price | G06Q 30/0601 705/26.1 |
| 2011/0138047 | A1* | 6/2011 | Brown | G06Q 10/10 709/226 |
| 2012/0150668 | A1* | 6/2012 | Wade | G06Q 20/202 705/16 |
| 2013/0173430 | A1* | 7/2013 | Benjamin | G06Q 30/0627 705/26.63 |
| 2015/0371322 | A1* | 12/2015 | Veres | G06Q 30/0601 705/27.1 |
| 2016/0300223 | A1* | 10/2016 | Grey | G06Q 20/3827 |

OTHER PUBLICATIONS

Communication Pursuant to Article 94(3) for European Patent Application No. 16/717936 dated Dec. 12, 2019, 8 Pages.
Allen Dreibelbis et al., "Enterprise Master Data Management: An SOA Approach to Managing Core Information", Jun. 15, 2008 (Jun. 15, 2008), IBM Press, XP055649881, ISBN: 978-0-13-236625-0, pp. Foreword-Ch01, Index, 86 Pages.
Toby Teorey et al., "Database Modeling & Design", Fourth Edition, The Morgan Kaufmann Series in Data Management Systems, 2006, 289 Pages.
Wikipedia: "Database normalization", Internet Article, Apr. 16, 2016 (Apr. 16, 2016), XP055649898, Retrieved from the Internet: URL:https://en.wikipedia.org/w/index.php?title=Database_normalization&oldid=715509778 [retrieved on Dec. 5, 2019], 7 Pages.
Wikipedia: "Entity-relationship model", Internet Article, Mar. 30, 2016 (Mar. 30, 2016), XP055649891, Retrieved from the Internet: URL:https://en.wikipedia.org/w/index.php?title=Entity-relationship_model&oldid=712636197 [retrieved on Dec. 5, 2019], 12 Pages.
Wikipedia: "Master data management", Internet Article, Apr. 4, 2016 (Apr. 4, 2016), XP055649901, Retrieved from the Internet: URL:https://en.wikipedia.org/w/index.php?title=Master_data_management&oldid=713513843 [retrieved on Dec. 5, 2019], 5 Pages.
International Search Report and Written Opinion of the International Searching Authority, PCT/EP2016/058926 dated May 27, 2016, 13 pages.
Tanenbaum, A.S., et al., Distributed Systems: Principles and Paradigms ($2^{nd}$ Edition) Oct. 12, 2006, Prentice Hall (XP055272991) 238 pages.
Rankl, W., et al., "Smart Card Handbook," ($4^{th}$ Edition) Jul. 19, 2010, Wiley, Chichester, West Sussex, U.K. (XP055273132) 240 pages.
Mansmann, U., "Kinderleicht—Smartphone-Tarife mit voller Kostenkontrolle," Oct. 2, 2015, Retrieved from the Internet: URL:http://epaper.heise.de/download/archiv/3b16dd4d74bf/ct.15.22.126-129.pdf (retrieved on May 17, 2016) 4 pages.

* cited by examiner

METHODS AND SYSTEMS FOR PROVISIONING OF CUSTOMER PRODUCT

CROSS REFERENCE TO RELATED APPLICATIONS

This application is a 35 U.S.C. § 371 national stage application of PCT International Application No. PCT/EP2016/058926 filed on Apr. 21, 2016, the disclosure and content of which is incorporated by reference herein in its entirety.

TECHNICAL FIELD

The present invention generally relates to communication networks and, more particularly, to mechanisms and techniques for providing and/or provisioning products.

BACKGROUND

Over time the number of products and services provided to users of telecommunication products has grown significantly. For example, in the early years of wireless communication, devices could be used for conversations and perhaps also had the ability to send and receive text messages. Over time, technology advanced and wireless phones of varying capabilities were introduced which had access to various services provided by network operators, e.g., data services. More recently there are numerous devices, e.g., so called "smart" phones and tablets, which can access communication networks in which the operators of the networks, and other parties, provide many different types of services, applications, etc. These services and products have become so numerous that updating them has become an expensive challenge.

An example of how telecommunication services and products are provided will now be described with respect to a Charging and Billing system. In a Charging and Billing system, the services that a customer can use, e.g., sending a Short Message Service (SMS) to another party or utilizing mobile data, is modelled as a service which is realized through a product specification and a product offering. A product offering is an item that a customer actually sees to purchase. This product offering can be a single product or a bundled product. The product specification, for example, contains the configuration such as which services the product is related to and the product offering contains, for example, prices for using the services and also recurring fees, etc.

FIG. 1 illustrates a portion of a conventional product provisioning process associated with entities, a customer and product. When a customer 102 orders a product offering it is instantiated as a product instance 106 on the contract 104 of the customer 102. The service and other entities are also realized as personal instances on the contract 104 which is needed in order for the customer 102 to be able to use the product. For example, as shown in FIG. 1, there is also a Customer Facing Service (CFS) 112 and a Resource Facing Service (RFS) 114 associated with the product instance 106 which also have corresponding instances associated with the product specification 110. These are the Customer Facing Service Specification (CFSS) 116 and Resource Facing Service Specification (RFSS) 118. Alternatively, the service and other entities could have been instantiated before and already be present from a previous product purchase. As soon as the product instance 106 is instantiated on the contract and set to an active status, the customer 102 can use the services associated with the product. The personal instances, such as the product or service instance, can also contain values that are unique for the customer and contract, such as contact address, personal prices or favorite discounted numbers. Associated with the product instance 104 are one or more product offering entities 108 describing the product and product specification entities 110 describing technical definitions, e.g., price models used in charging with, as desired, input of the price from the product offering.

In most cases, as shown in FIGS. 2 and 3, a customer belongs to a base profile (which is also known as a base subscription) that has a set of products and data that are common for that profile. For example, Customer1 200 can have a contract, Contract1 202, which is linked to the products and services that the customer has purchased or subscribed to. In this example, Product A 204, Product B 206, Product C 208 and Product D 210. Similarly, as shown in FIG. 3, Customer2 300 has a contract, Contract2 302, which is also linked to the products and services that the customer has purchased or subscribed to. In this example, Product A 304, Product B 306, Product C 308 and Product D 310. These products and services can be considered to be representations of instantiations of base products of a subscription. In most systems, a majority of the instances used are of this base product type. However, in addition to the base subscription, the customer can have add-on products which are products that the customer has bought on top of the base subscription.

The instantiated products typically include various data items or fields described herein as "attributes" which may need to be updated. Examples of attributes that a product can include which may need to be modified at some point in time, include: name; description; links to so-called "child products" (for example, when the product is a bundle that contains several other products, e.g., one product for SMS, another product for voice calls, and a third product for data traffic); links to services for which the product contains the pricing; links to buckets which contain the resources used to pay, e.g., using the service it contains; prices for usage, recurring fees, start-up fees, etc.; the link to the product offering that it is instantiated from; and characteristic values of the products if they are personalized or customized.

In existing systems each product offering is instantiated on the customer contract directly which results in some portion of the information associated with each product being stored multiple times in the system. This is problematic and becoming more so as the quantity of devices and the quantity of products/services also grows.

Provisioning of changes to the product offering, such as updates of configuration or error corrections requires resources and time in order to update all customer instances and typically is performed in batches instead of all at once. Additionally, as potentially millions of instances need to be touched or modified this provisioning usually occurs during low traffic times in the system. This mass provisioning of products is also known as "batch processing". This typically requires that the batch processing needs to be performed well in advance of the launch date for a new version of a product. This launch date is preferably chosen with an acceptable lead time so that all customers using the same product will have the changes applied in such a way that they become active at substantially the same time. The delay in product change implementation can also be problematic in that being forced to have a time delay in implementing changes could cause a negative experience for the customer depending on, for example, the nature of the change.

An example of batch processing, in a simplified format, is shown in FIG. 4 in which a product is disseminated to two different users. In this example, Customer1 400 and Customer2 406 each have their own contract, Contract 1 402 and Contract 2 408, respectively. Each contract also includes information about a product, Product A 404, for each customers' contract. A change, shown as Product Offering 410, to Product A is occurring and needs to be disseminated via batch processing to each user as shown by the arrows 412 and 414. This can be costly in terms of time and resources, particularly when there are many products, many changes, many users and each entity needs to be updated individually as part of the batch process.

For the case of error correction, performing batch processing may cause additional problems. For example, for all of the transactions that have occurred, from the point in time when the change was applied and until all of the instances have been provisioned with the change, the operator may also need to correct those transactions afterwards. This correction can be performed through, for example, re-rating or by compensating the customer directly if re-rating is not possible.

Alternatively, a variety of sub-optimal solutions have been built to avoid batch updates and these complex solutions typically also create their own sets of problems. For example, one alternative is to not allow changes that affect all instances, i.e., to use a system which is very inflexible in terms of changes that are allowed. For another example, a system could not update existing products but instead provision new product instances (and other entity instances) and for customers to discontinue use of the old product.

Thus, there is a need to provide methods and devices that overcome the above-described drawbacks of the conventional approach to implementing product provisioning.

SUMMARY

Embodiments allow for instantiating products, services and the like that are common as global entities to be accessed by all customers that order these products and services. This reduces the cost and time associated with provisioning products and services by reducing the number of copies of such data, in some cases to a single instance.

According to an embodiment, there is a method of product provision. The method includes: evaluating each entity of a product based on one or more criteria to determine if the product can be populated in a database as a globally updateable product; if the product has been determined to be eligible for being populated in the database as a globally updateable product then performing the following steps: determining, for each entity of the product, eligibility for the entity to be a global entity; generating a global entity instance for each eligible entity of the product; saving the global entity instance for each eligible entity of the product; generating a default entity instance for each ineligible entity of the product; and saving each default entity instance in the database; if the product has been determined to be ineligible for being populated in the database as a globally updateable product then instantiating and populating the product in the database as a local product.

According to an embodiment, there is communications node for product provisioning. The communications node includes: a processor performing the steps of: evaluating each entity of a product based on one or more criteria stored in a memory to determine if the product can be populated in a database as a globally updateable product; if the product instance has been determined to be eligible for being populated in the database as a globally updateable product then performing the following steps: determining, for each entity of the product, eligibility for the entity to be a global entity; generating a global entity instance for each eligible entity of the product; saving the global entity instance for each eligible entity of the product; generating a default entity instance for each ineligible entity of the product; and saving each default entity instance in the database; if the product has been determined to be ineligible for being populated in the database as a globally updateable product then populating the product in the database as a local product.

According to an embodiment, there is a non-transitory computer readable medium for product provisioning which when executed by a processor performs the steps of: evaluating each entity of a product based on one or more criteria to determine if the product can be populated in a database as a globally updateable product; if the product has been determined to be eligible for being populated in the database as a globally updateable product then performing the following steps: determining, for each entity of the product, eligibility for the entity to be a global entity; generating a global entity instance for each eligible entity of the product; saving the global entity instance for each eligible entity of the product; generating a default entity instance for each ineligible entity of the product; and saving each default entity instance in the database; if the product has been determined to be ineligible for being populated in the database as a globally updateable product then instantiating and populating the product in the database as a local product.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
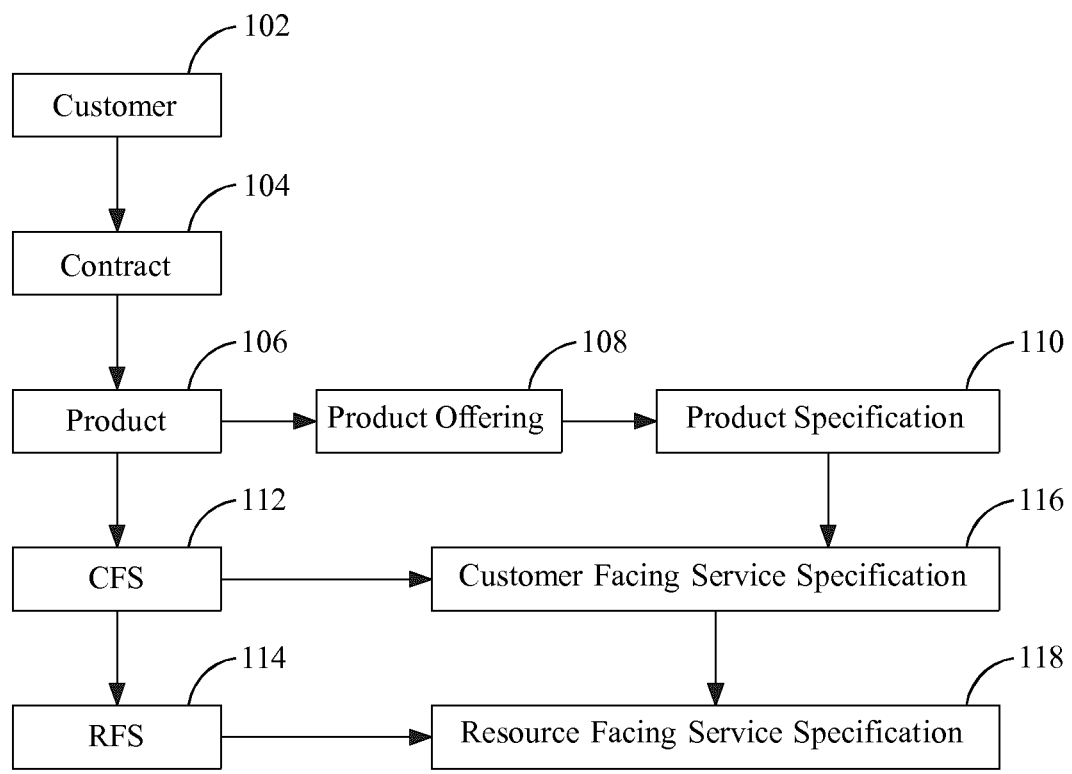
FIG. 1 illustrates a portion of a conventional product provisioning process.
Figure 2:
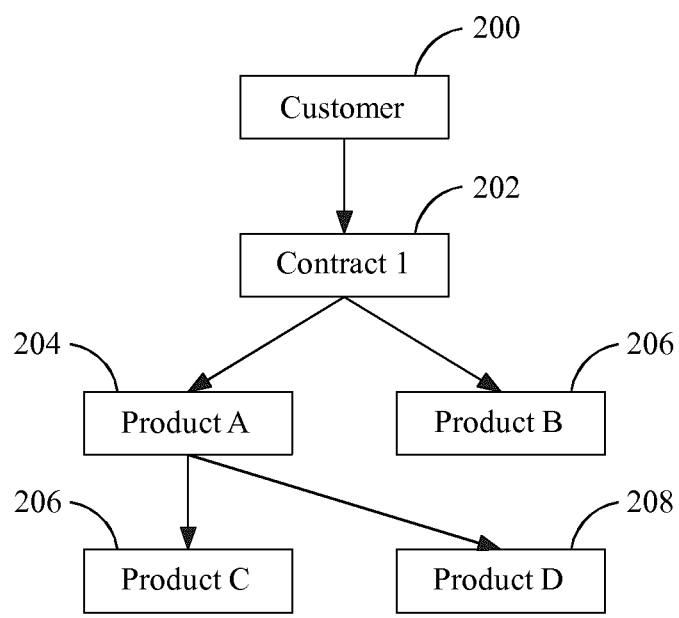
FIG. 2 shows a customer with a base subscription.
Figure 3:
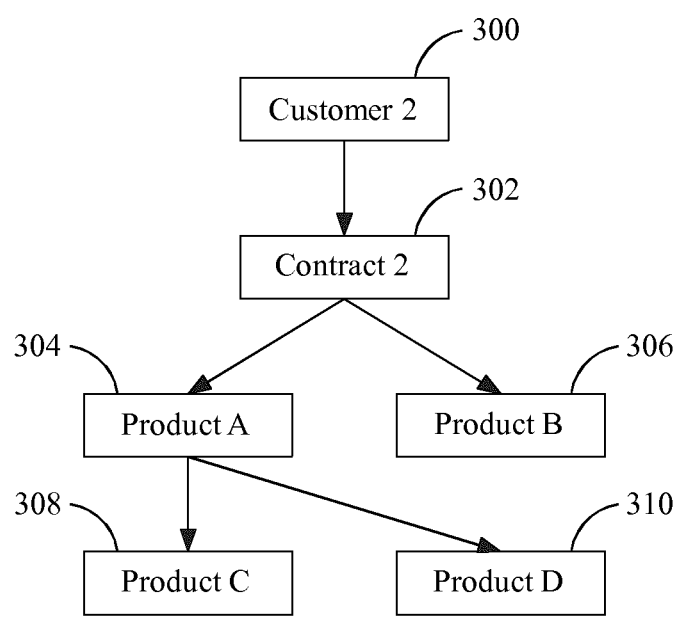
FIG. 3 shows another customer with a base subscription.
Figure 4:
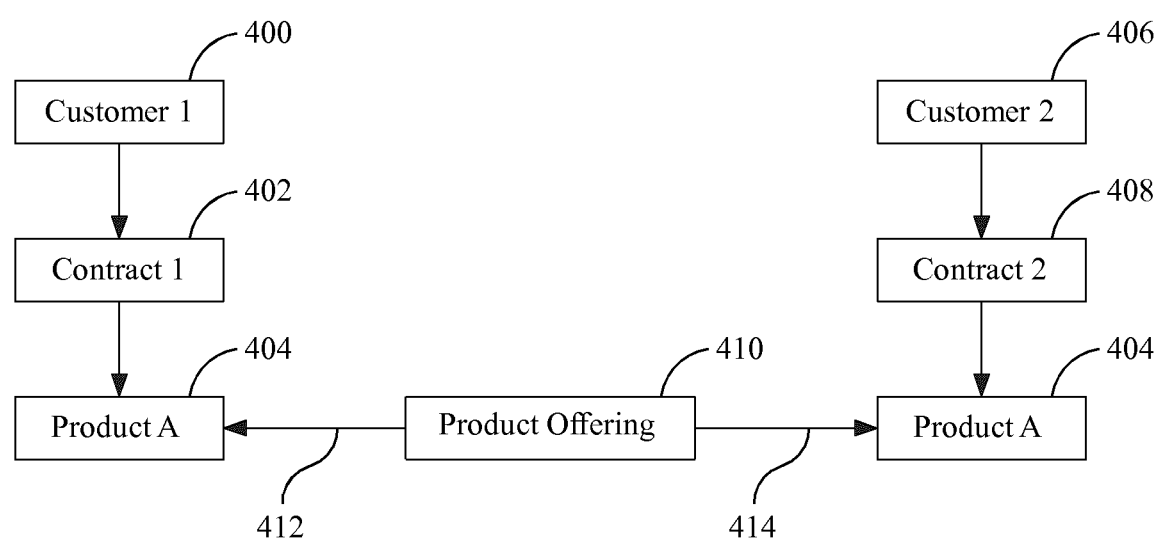
FIG. 4 illustrates an example of batch processing.

The following description of the embodiments refers to the accompanying drawings. The same reference numbers in different drawings identify the same or similar elements. The following detailed description does not limit the invention.

Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described above, there are problems associated with current methods of provisioning products and services, e.g., multiple copies of data, long provisioning times and large resource requirements, however the following embodiments describe systems and methods which reduce these issues by reducing the number of copies of such data, in some cases to a single instance of some of the entities. These products and services can include, but are not limited to, mobile applications, data services, games and voice services used by customers' user equipments (UEs) and other customer devices.

For example, instead of instantiating all products directly under the customer contract, some of the products, services and the like that are common can be instantiated as global entities to be reused by all customers (also referred to herein as "users") that order these products and services. Whether or not a particular entity can be instantiated as a global entity, or not, will depend upon, for example, the content of the entity and an active time frame of the entity. The view from the outside, or user's perspective, does not need to be changed by introducing these global definitions and surrounding systems need not be aware if an entity is a local or a global entity.

To assist in clarifying the different aspects of embodiments described herein, various concepts and terms are now described. A product typically describes a service and how it can be used by a customer. A customer, when purchasing a product (which can be a single or a bundled product), sees a product offering which describes the service. The product offering is linked to one or several services that it describes through the product specification. Entities are associated with the product offering, the service specification and associated resources. Entities also describe various elements of the service to be provided and such information as pricing.

Product offerings are not in the so-called technical portion of an operator network which does the actual implementation of the service, i.e., they do not include the executable logic to perform the desired service. Instead product offerings are descriptors which include commercial information, e.g., prices for usage, setup, monthly fees, etc., seen at a higher level by customers. The entities, associated with the product specification and service specification are at a more detailed level seen by the system for the system to understand what executable elements, e.g., instances, need to be fetched, pointed to or created. The technical specifications describe the execution logic of an entity and the instance gives the user the right to "execute" an entity and holds the customer's personal attributes and preferences of the entity.

An entity, as used herein, can be a local entity, e.g., to be instantiated on each customer contract when purchased, or a global entity, e.g., stored in a single location but referenced via a link. Additionally, there are default entity instances which are used to hold personal data for a global product instance. Attributes are pieces of information that an entity instance can contain.

Embodiments determine which products, and which entities can be defined using global or local entities. Additionally, embodiments enable holding some personalized data for a global entity by using a default entity. The default entity instance holds personal data for a global entity instance, but is instantiated at the customer contract. By using global entity definitions where possible, e.g., when the amount of personal data is low, the quantity of batch updates performed for provisioning of products will be reduced, which in turn reduces memory storage, reduces error possibility, reduces the updating time required for products and services and reduces cost to network operators. Further, embodiments allow for a faster time to update configurations for the whole customer base as an update to a single global instance will affect all contracts using that global definition instantly.

Figure 5:
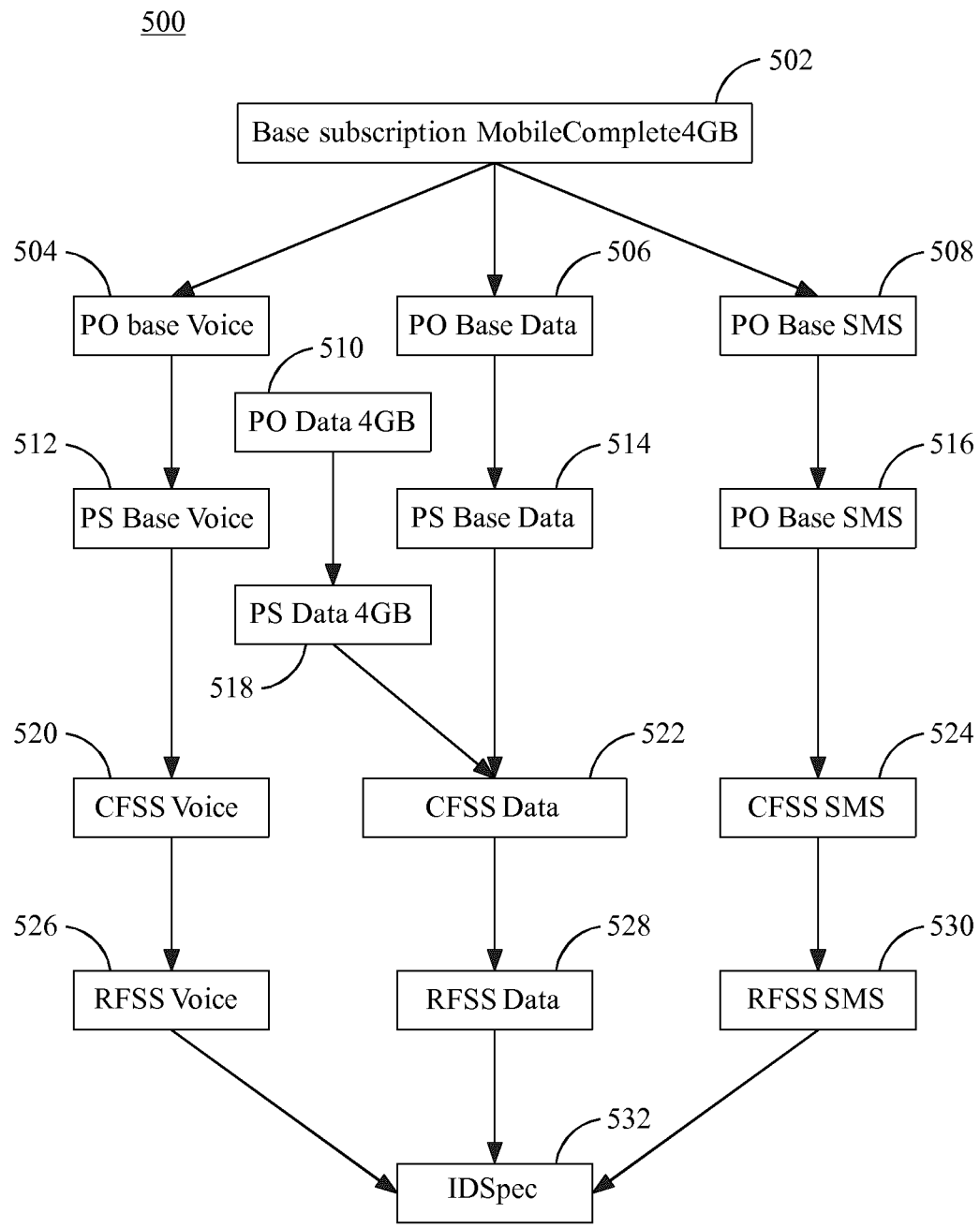
FIG. 5 depicts an example of a bundled product according to an embodiment.

Having described embodiments at a higher level, an example of a bundled product which has multiple entities and which has a subscription template that users can purchase for use on or by a device is now described with respect to FIG. 5. The subscription template 500 includes a base subscription entitled MobileComplete4GB 502 and is defined in a catalog manager. MobileComplete4GB 502 represents, for example, a subscription that provides a customer the ability to use voice, data, SMS from a mobile device and is limited to a four gigabyte (GB) allowance. MobileComplete4GB 502 includes a plurality of entities: Product Offering (PO) Base Voice 504, PO Base Data 506, PO Base Short Message Service (SMS) 508, PO Data 4GB 510, Product Specification (PS) Base Voice 512, PS Base Data 514, PS Base SMS 516, PS Data 4GB 518, Customer Facing Service Specification (CFSS) Voice 520, CFSS Data 522, CFSS SMS 524, Resource Facing Service Specification (RFSS) Voice 526, RFSS Data 528, RFSS SMS 530 and IDSpec 532.

Product Offerings generally describe the product being offered and Product Specifications generally describe the more technical aspects associated with the PO, e.g., charging. All of these entities, in this example, are global entities with the exception of IDSpec 532 which is a default entity. Additionally, while each entity is shown as a single block, each entity could have one or more sub-entities (not shown) associated with them.

According to an embodiment, there is a Customer and Partner management (CPM) system (described in more detail below with respect to FIG. 8) which is responsible for instantiating customers and also determines when a new customer and contract should be instantiated with the base subscription MobileComplete4GB 502 by receiving a global reference "globalRef" relation to the global definition for MobileComplete4GB 502. If a global definition of MobileComplete4GB does not exist then the global definition has to be created first.

For simplicity, in this example illustrated in FIG. 5, it is assumed that all of the products and entities under the base subscription are instantiated commonly, with an active state and a validity of "BeginningOfTime" to "EndofTime" with the exception of IDSpec 532. This, in this embodiment, allows those entities to be global entities. Regarding the entity IDspec, which can be a phone number of a user, the value in the entity is unique for each user and thus is not global. For cases such as this, a default entity is created to hold the unique data and acts as a holding spot in the MobileComplete4GB 502 bundle for that personal data.

According to an embodiment, a default entity is an overlay entity where customer specific details are stored for an entity which is otherwise defined using global entities. The default entity will only store specific information and is created when anything within the newly requested creation of data does not match the globally defined data. When a default entity is created a "ShadowRef" is used as a relation to be able to distinguish between a normal entity, e.g., a local or global entity, and a default entity.

Figure 6:
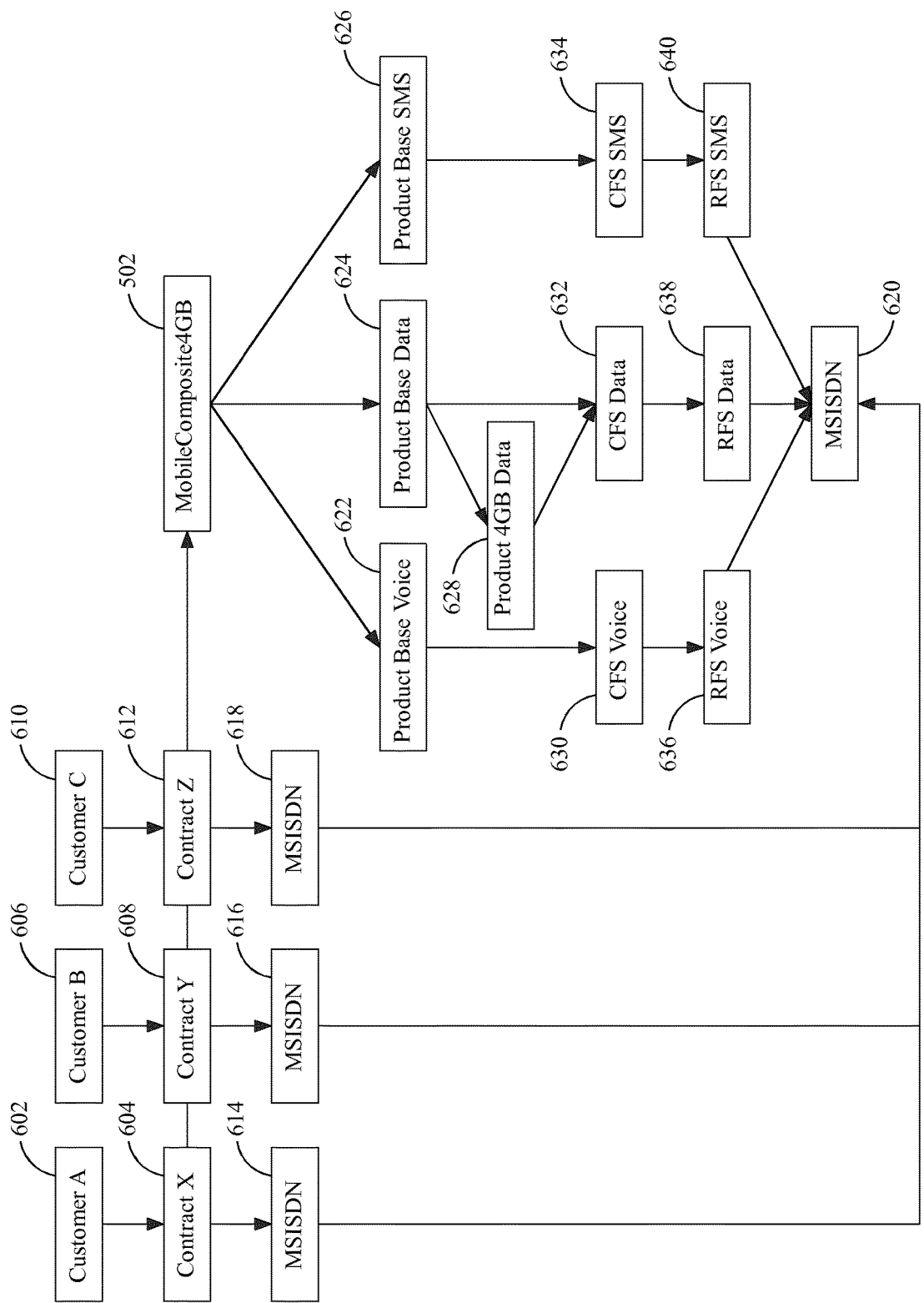
FIG. 6 shows a view between customers, contracts and a bundled product according to an embodiment.

According to an embodiment, the inside perspective between customers, contracts and the bundle product MobileComplete4GB 502 would look as shown in FIG. 6. More specifically, in FIG. 6, Customer A 602 has a Contract X 604, Customer B 606 has a Contract Y 608 and Customer C 610 has a Contract Z 612 with each of the contracts 604, 608, 612 being associated with the bundle product MobileComplete4GB 502. Additionally, each customer and their respective contract also has a unique identifier to uniquely identify the user. In this example, the unique identifier is the Mobile Station International Subscriber Directory Number (MSISDN) 614, 616 and 618 associated with each customer. A default entity MSISDN 620 has been created as an overlay for use by the global bundle associated with MobileComplete4GB 502. MobileComplete4GB further includes, from the customer instance point of view, Product Base Voice 622, Product Base Data 624, Product Base (SMS) 626, Product 4GB Data 628, Customer Facing Specification (CFS) Voice 630, CFS Data 632, CFS SMS 634, Resource Facing Specification (RFS) Voice 636, RFS Data 638, RFS SMS 640.

By using these global entities for introducing new products and services on a customer base, cost will decrease significantly as the new products and services only need to be written once on the global entities that make up the base subscription and not on each single customer contract. Considering the example shown in FIG. 6, it can be seen that instead of updating a large plurality of entities for each customer contract there is a link provided between each customer contract and the globally stored product bundle as well as a link between the various MSISDNs 614, 616 and 618 to the default entity MSISDN 620.

Figure 7:
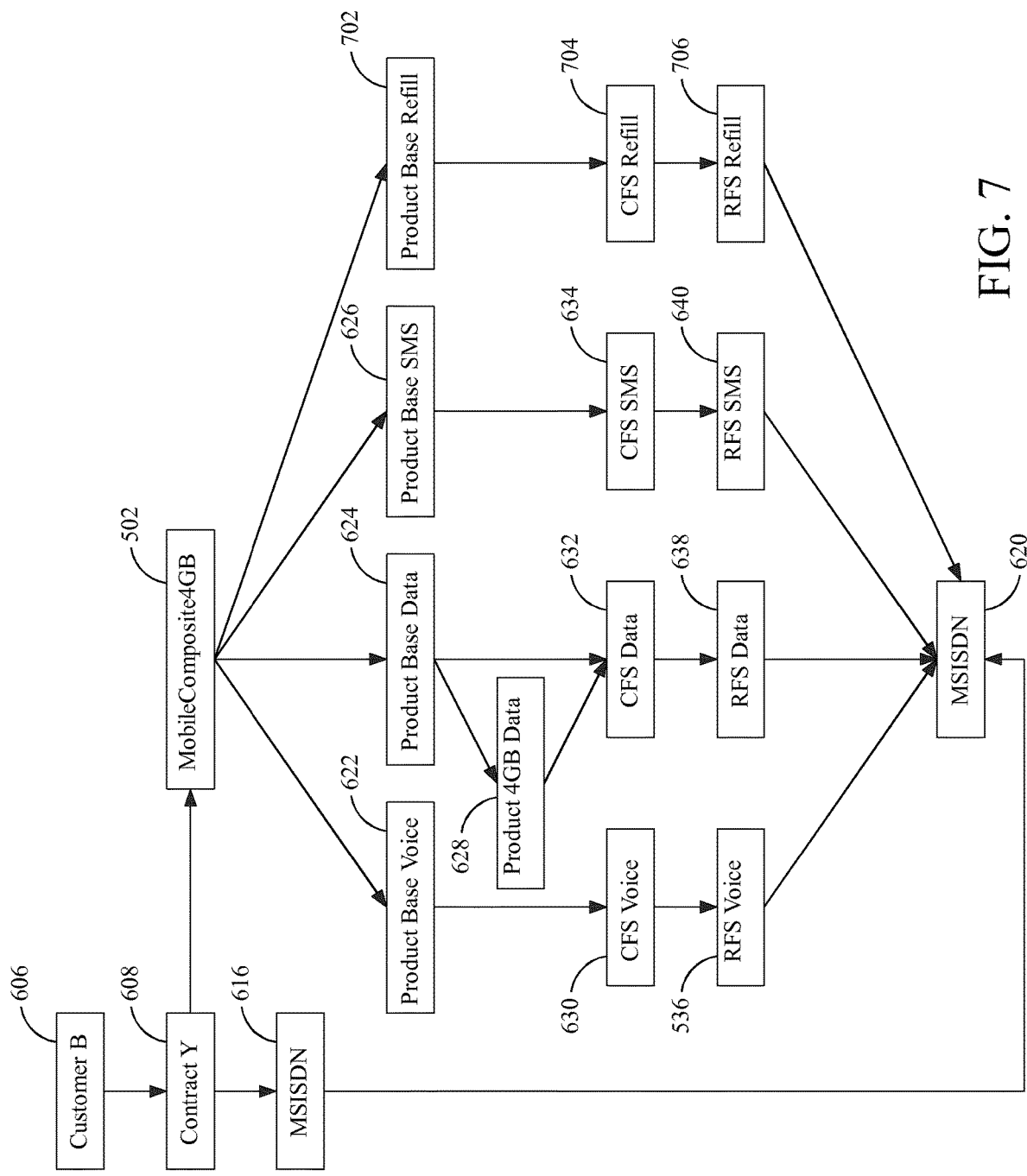
FIG. 7 illustrates provisioning an update of a product according to an embodiment.

According to an embodiment, the global provisioning process described with respect to FIG. 6 as it is used to introduce new products can also be used for provisioning updates to products and services as is now described with respect to FIG. 7. In this example shown in FIG. 7, a new service or product called Base Refill 702 has been added to the product bundle MobileComplete4GB 502, which includes the entities previously discussed with respect to FIG. 6. Base Refill 702 could, for example, be an option which allows a costumer to add more funds to a pre-paid account via a service called basic refill by either a web page where one could pay to do refills or by a voucher system. Base Refill 702 also includes the entities CFS Refill 704 and RFS Refill 706. By updating the product offering for MobileComplete4GB the global definition instance can be provisioned with the new entities and the result is that the new refill service will be substantially instantly available for all the customers that have MobileComplete4GB 502.

Figure 8:
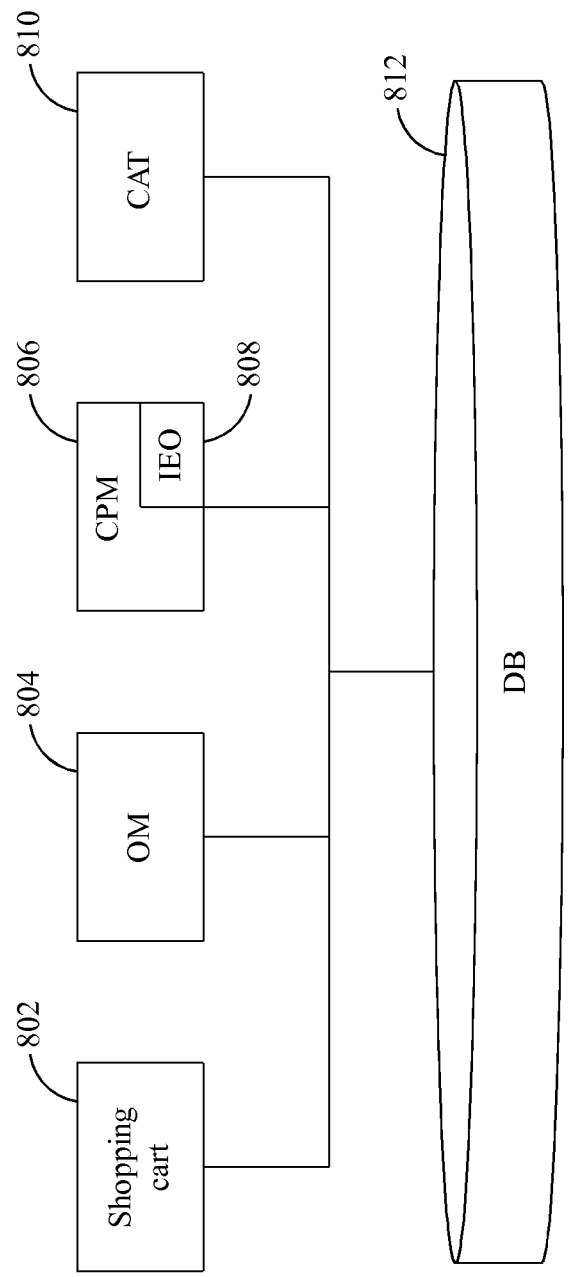
FIG. 8 depicts nodes and functions supporting provisioning according to an embodiment.

As described above, an entity associated with a product can be instantiated either locally or globally, e.g., in a database associated with a billing and charging system. According to an embodiment, there is a function labeled the Intelligent Entity Optimizer (IEO) which determines whether an entity is to be a local entity, a global entity, a default entity or multiple entities, e.g., a global entity and a default entity. FIG. 8 shows various nodes and functions which interact for processing orders and determining the types of entities to be generated for products and services. In FIG. 8, there is a shopping cart 802 which contains an order generated by a customer. The Order Management (OM) node 804 is responsible for processing the ordering and coordinating all changes required based on the placed order, e.g., that a new service entity needs to be created or a phone number needs to be posted to the customer.

The Customer and Partner Management (CPM) node 806 keeps the actual customer information, such as unique entities of products and services. The IEO 808 could be a part of the instance creation flow inside the CPM 806, alternatively, the IEO 808 could be a standalone node or a portion of another node. The Catalog Manager (CAT) 810 manages a catalog of product offerings and retains the service and product specification of entities that could be purchased by a customer. These service and product specification of entities can be used by both the OM 804 and the CPM 806 when generating the instantiation of entities. Additionally, there is a database (DB) 812 for storing information, e.g., local, global and default entities.

Figure 9:
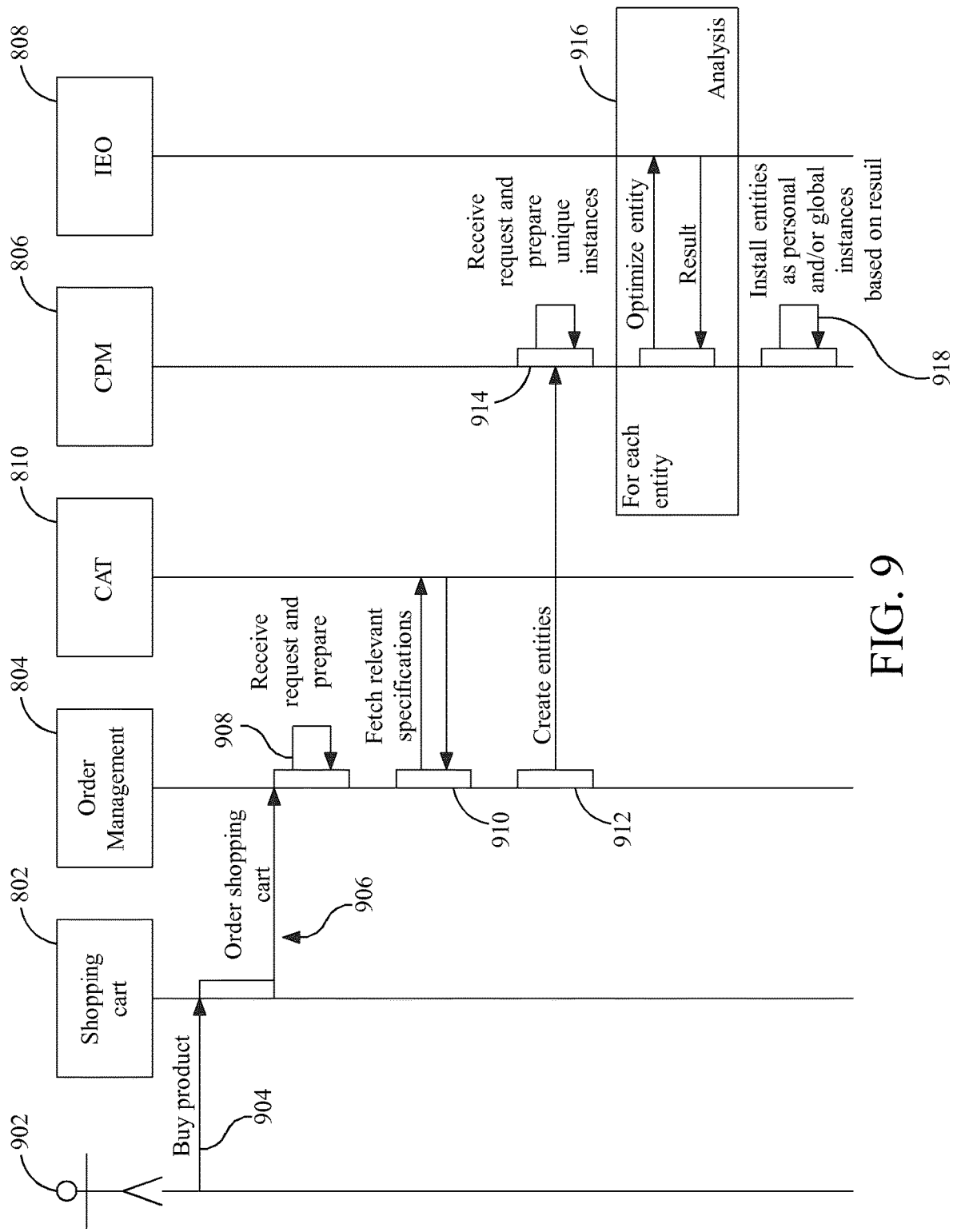
FIG. 9 illustrates an order flow according to an embodiment.

Using the nodes and functions described with respect to FIG. 8, a sequence diagram depicting the flow of an order request according to an embodiment is shown in FIG. 9 and will now be described. In this example, a customer 902 has web-surfed into a self-care portal and buys a product, e.g., MobileComplete4G 502, as shown in step 904. The order is put into a shopping cart 802 and sent to Order Management 804 in step 906. Order Management 804 receives the request and prepares the request for processing in step 908. Associated with processing the request, the OM 804 also requests and receives information from the CAT 810 in step 910, e.g., information about the technical specification of the ordered product. The OM 804 then uses this information to instruct the CPM 806 which entities need to be created on the customer's contract in step 912.

The CPM 806 receives the request from the OM 804 to create unique instances of the requested entities and then creates the unique instances in step 914. Once the unique instances are created, the CPM 806 sends the unique instances of the requested entities to the IEO 808. The IEO 808 then optimizes the entities by determining if any entities could be implemented as global entities and returns that information to the CPM 806 as shown in block 916. Examples of specific algorithms which can be used to make this determination are provided below with respect to FIG. 10. The CPM 806 then installs the entities as local entities and/or global entities by entering the local entities onto the customer's contract and entering references or links to the global entities on the customer's contract as shown in step 918.

It is to be understood that the example described above with respect to FIG. 9 is simplified in that for most expected orders from customers, there could be instantiation of several entities. For example a product and a service, as well as one or more resources to hold units to be used for consumption. All entities relevant for the order will be examined by the IEO 808 by looping through the entities over and performing the global or local entity analysis for each.

Figure 10:
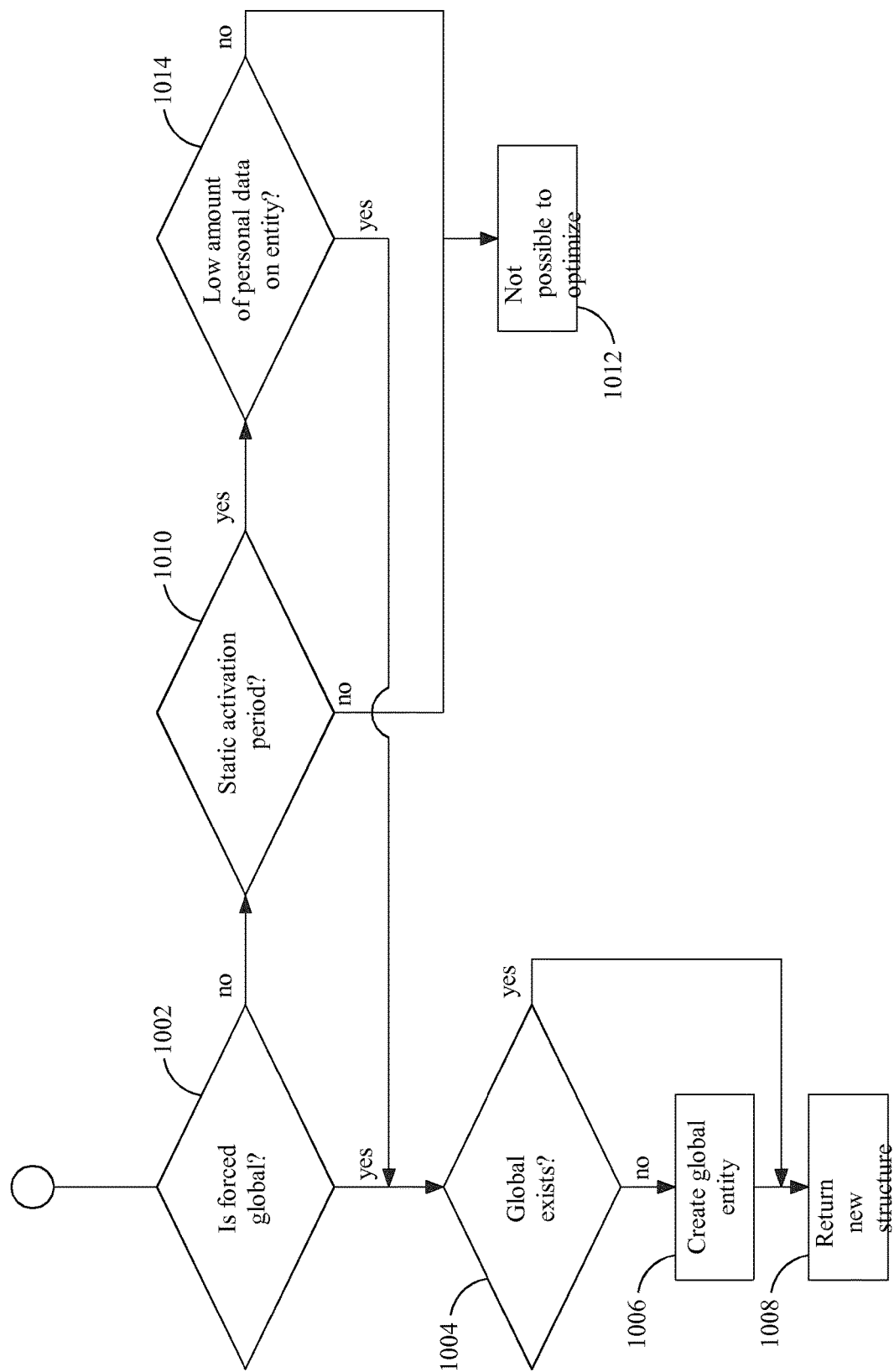
FIG. 10 shows an algorithm according to an embodiment.

According to an embodiment, the IEO 808 can implement various algorithms optimizing of a product in step 916 by analyzing the unique instances of the requested entities of the product. FIG. 10 shows one example of an algorithm that will now be described. After receiving the input from the CPM 806, the IEO 806 analyzes the first entity. As shown in step 1002, the configuration of the entity is examined to determine if there is any flag or parameter that directly instructs or suggests to the IEO 806 that this particular entity should be instantiated as a global entity. If the flag or parameter is present, then there is a further determination of whether a global entity already exists in step 1004. If there is a global entity in existence that information is captured in a new structure which is returned to the CPM 806 in step 1008. If there is no global entity in existence a global entity is constructed in step 1006 and this information is captured in a new structure which is returned to the CPM 806 in step 1008.

For the case when there is no flag or parameter that directly instructs or suggests to the IEO that this particular entity should be instantiated as a global entity, then entity is the checked to see if it has a static activation period that is acceptable in step 1010, where an acceptable static activation period could be "always active" or has a known start and/or end date. More generally, a static activation period in this context is one of a plurality of predetermined static activation types. If there is no acceptable static activation period then it is determined that the entity being analyzed is not eligible to be a global entity in step 1012 and that information is returned to the CPM 806. If there is an acceptable static activation period, then in step 1014 it is determined by the IEO 808 if there is a sufficiently low amount of personal data on the entity. In this context, personal data refers to data that is personal (i.e., widely varying) based on the user of the product. This low amount of personal data can be a predetermined threshold, e.g., 0, 1 or 2 fields of personal data, but can be modified by the operator network as desired with the understanding that the more personal data for which default entities need to be created, the cost for doing so increases.

According to an embodiment, the IEO 808 can determine if a particular data field in an entity includes personal data by receiving a default value from the associated specification which indicates no personal value required. Alternatively, a value could be received as "personal" which is the same as the default on the specification. If the amount of personal data on an entity is less that the threshold amount, then the flow returns to step 1004, where the process for instantiating a global entity (existing or new) is performed as described above with respect to steps 1004, 1006 and 1008. If not, then the flow proceeds to step 1012 and the entity being evaluated is identified for instantiation as a local entity instance rather than a global entity instance.

The embodiment described with respect to FIG. 10 shows three different characteristics for which the entity is examined to be instantiated as either a global entity or a local entity. Alternative embodiments could use fewer characteristics or more characteristics for determining eligibility for becoming global. For example, the IEO 808 could only check for a flag or parameter that directly suggests an entity being eligible to become a global entity. An example of a case where a product or service could have such a flag or parameter is the case when there is a product offering that is only used in a base subscription. Other guidelines which can be used for determining global eligibility of an entity include where the activation period is long lived, the product should not be activated by a traffic request and that the entity does not contain many personal values, as the more personal values the more cost is associated with making the entity global.

Figure 11:
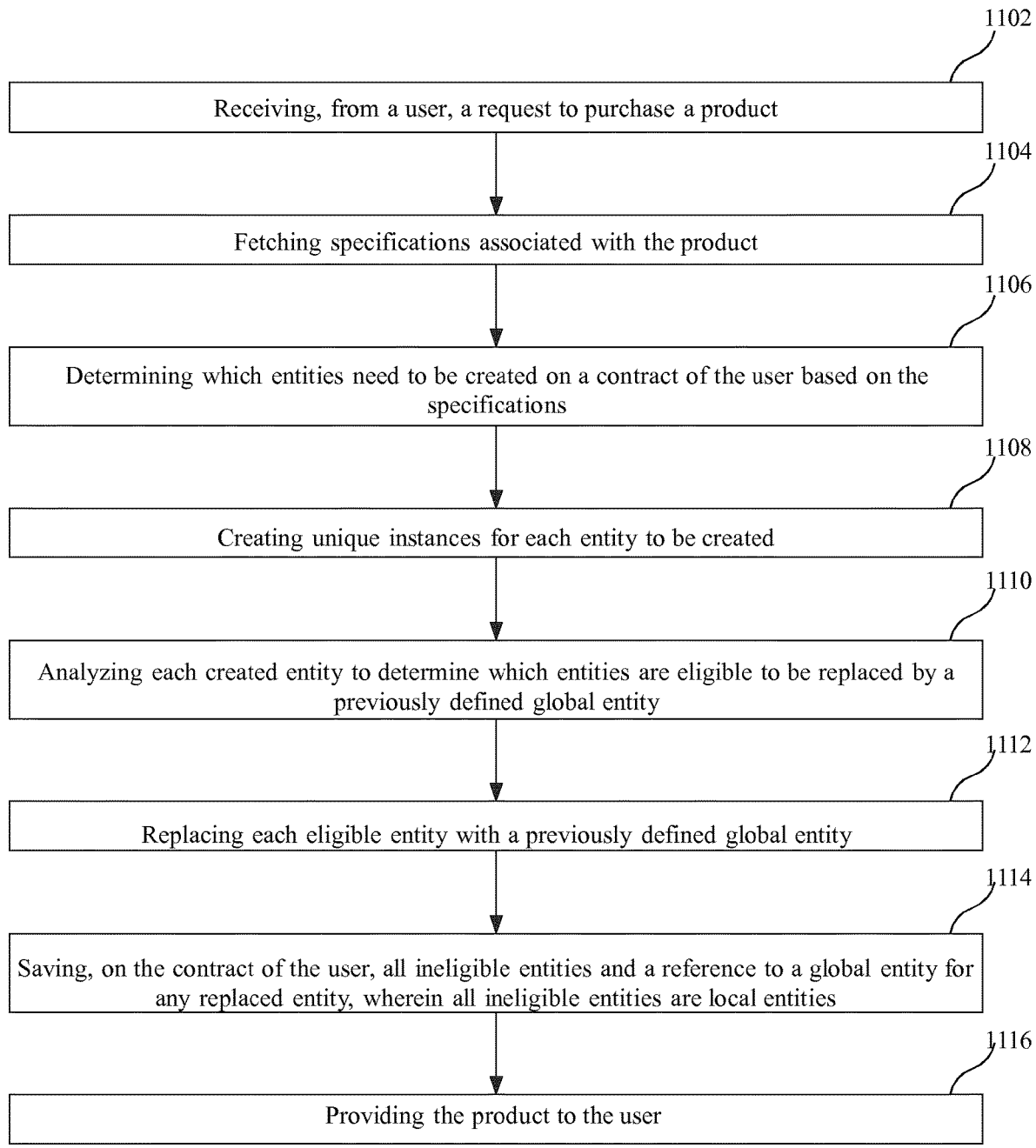
FIG. 11 shows a flowchart of a method for provisioning a product according to an embodiment.

According to an embodiment there is a method for product provisioning as shown in FIG. 11. The method includes: in step 1102, receiving, from a user, a request to purchase a product; in step 1104, fetching specifications associated with the product; in step 1106, determining which entities need to be created on a contract of the user based on the specifications; in step 1108, creating unique instances for each entity to be created; in step 1110, analyzing each created entity to determine which entities are eligible to be replaced by a previously defined global entity; in step 1112, replacing each eligible entity with a previously defined global entity; in step 1114, save, on the contract of the user, all ineligible entities and a reference to a global entity for any replaced entity, wherein all ineligible entities are local entities; and in step 1116, providing the product to the user.

Figure 12:
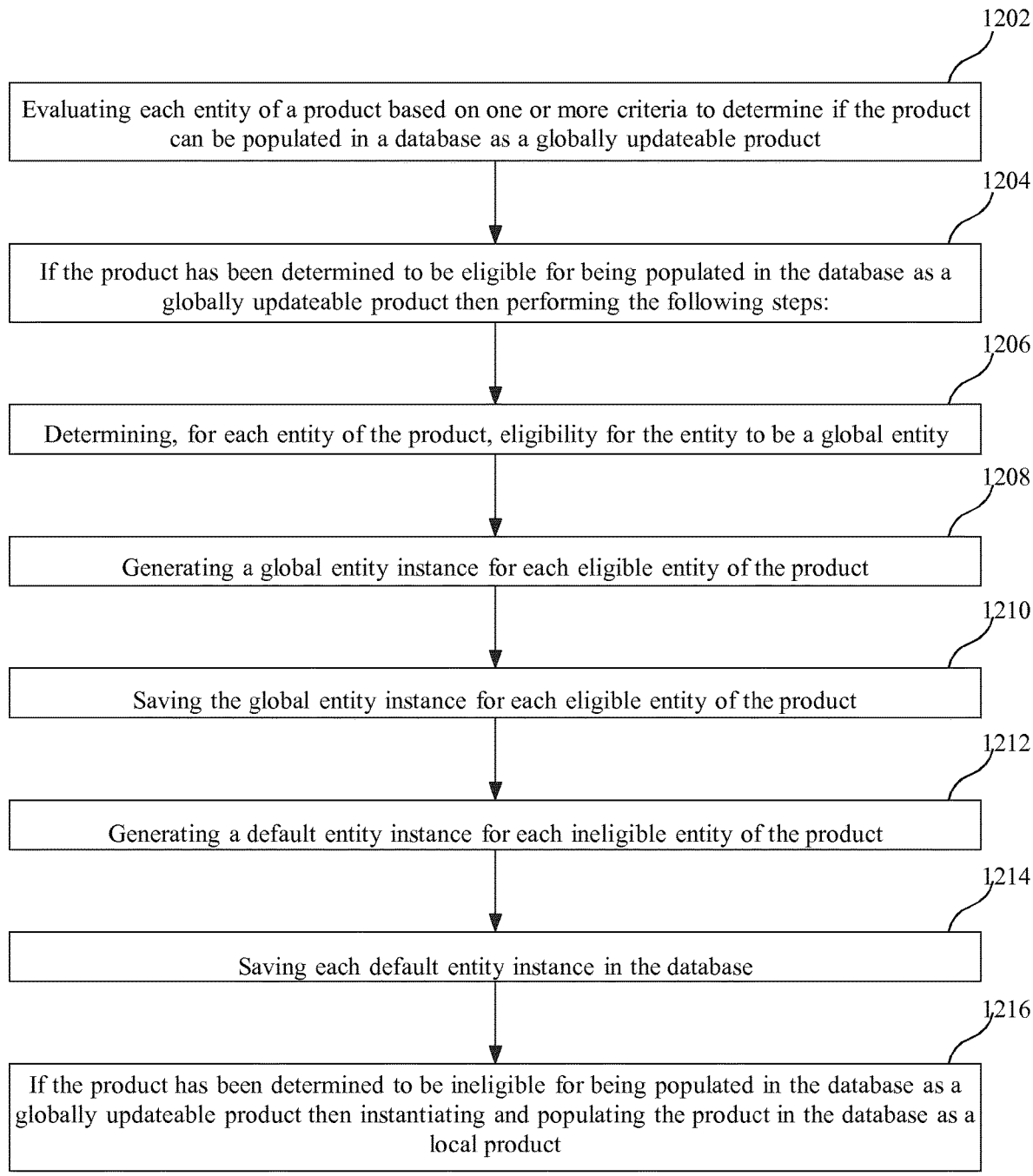
FIG. 12 illustrates a flowchart of another method for provisioning a product according to an embodiment.
Figure 13:
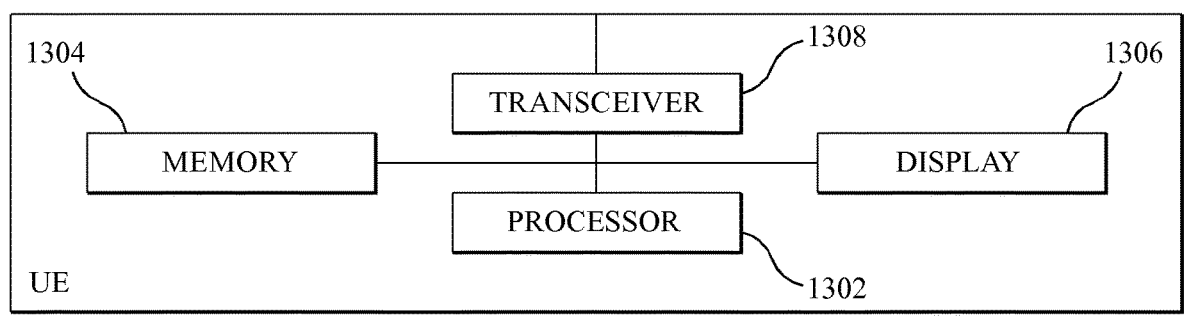
FIG. 13 shows a user equipment (UE) according to an embodiment.

According to an embodiment, there is another method for product provisioning as shown in FIG. 12. The method includes: in step 1202, evaluating each entity of a product based on one or more criteria to determine if the product can be populated in a database as a globally updateable product; in step 1204, if the product has been determined to be eligible for being populated in the database as a globally updateable product then performing the following steps: in step 1206, determining, for each entity of the product, eligibility for the entity to be a global entity; in step 1208, generating a global entity instance for each eligible entity of the product; in step 1210, saving the global entity instance for each eligible entity of the product; in step 1212, generating a default entity instance for each ineligible entity of the product; in step 1214, saving each default entity instance in the database; and in step 1216, if the product has been determined to be ineligible for being populated in the database as a globally updateable product then instantiating and populating the product in the database as a local product According to embodiments, products, services and associated updates can be provisioned to a customer's contract for use on a user equipment (UE) and/or other devices. An example of such a UE 1300 is shown in FIG. 13. The UE 1300 includes a processor 1302 for executing instructions, a display 1304 which can display information associated with various products and services, a memory 1306 which stores information and a transceiver 1308 for communicating with nodes of communication networks as well as other UEs and devices.

Figure 14:
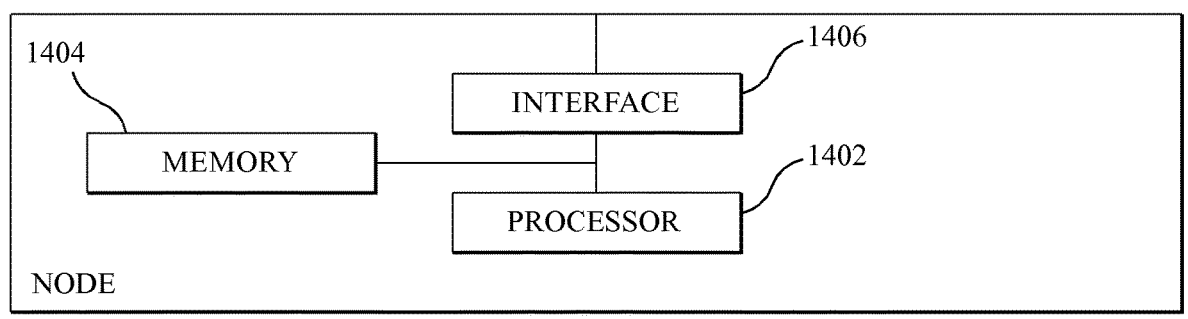
FIG. 14 depicts a communications node according to an embodiment.

According to an embodiment, a communications node can be used to implement one or more of the nodes and functions described herein, e.g., the shopping cart 802, the OM 804, the CPM 806, the IEO 808, the CAT 810 and the DB 812. An example of such a communications node is shown in FIG. 14. The communications node 1400 includes a processor 1402 for executing instructions, a memory 1404 for storing information and an interface 1406 for communicating with other nodes and devices in support of operations associated with a communications network and embodiments described herein.

The disclosed embodiments provide methods and devices for avoiding batch updates to the customer base by instead using global entities. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

As also will be appreciated by one skilled in the art, the embodiments may take the form of an entirely hardware embodiment or an embodiment combining hardware and software aspects. Further, the embodiments, e.g., the algorithms used by the IEO 808 may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method of product provisioning performed by a communications node, the method comprising:
    for each of a plurality of entities of a product, determining whether the entity is an eligible entity of a globally updateable product based on at least one of checking whether there is a static activation period of at least a predetermined duration associated with the entity and determining whether an amount of personal data on the entity is less than a predetermined threshold;
    generating a global entity instance for each eligible entity of the product, wherein the database contains information indicating a plurality of users who are each contracted to the product;
    saving the global entity instance of a product instance for each eligible entity of the product in the database, wherein each global entity instance is stored associated with the users indicated to be contracted to the product;
    generating a local entity instance for each ineligible entity of the product; and
    saving each local entity instance for each ineligible entity of the product in the database, wherein each of the local entity instances is stored associated with only one of the users indicated to be contracted to the product, and wherein the global and local entity instances form the product instance in the database; and
    performing a global update of the globally updatable product by provisioning in the database a single updated product instance containing updated global entity instances stored in the database each associated with the users indicated to be contracted to the product.

2. The method of claim 1, wherein the product is a service for use on a mobile device.

3. The method of claim 1, wherein the entity of the product comprises one of a name, a description, an identification, a serial number, one or more links to service which the product contains the pricing for, one or more links to one or more resources for using the service, one or more prices and a link to a product offering that the entity of the product is from.

4. The method of claim 1, wherein an entity is eligible to be a global entity if there is an indicator indicating that the entity is a global entity or if there is a static activation period of at least a predetermined duration associated with the entity and if the amount of personal data on the entity is less than a predetermined amount of personal data.

5. The method of claim 1, wherein if the globally updateable product includes one or more default entities then the default entities of the globally updateable product are not modified.

6. The method of claim 1, wherein the product instance, which includes one or more global entities for which a user has a contract, includes links on the contract to the database in which the global entities are stored.

7. The method of claim 1, wherein when saving the global entity instance of the product instance for each eligible entity of the product in the database, each global entity instance is stored with a link associated with each of the users indicated to be contracted to the product.

8. The method of claim 1, further comprising:
    performing a batch update of the local product by provisioning a plurality of users' contracts with changes to the product's local entities.

9. A communications node for product provisioning, the communications node comprising:
    a processor performing the steps of:
        for each of a plurality of entities of a product, determining whether the entity is an eligible entity of a globally updateable product based on at least one of checking whether there is a static activation period of at least a predetermined duration associated with the entity and determining whether an amount of personal data on the entity is less than a predetermined threshold;
        generating a global entity instance for each eligible entity of the product, wherein the database contains information indicating a plurality of users who are each contracted to the product;
        saving the global entity instance of a product instance for each eligible entity of the product in the database, wherein each global entity instance is stored associated with the users indicated to be contracted to the product;
        generating a local entity instance for each ineligible entity of the product; and
        saving each local entity instance for each ineligible entity of the product in the database, wherein each of the local entity instances is stored associated with only one of the users indicated to be contracted to the product, and wherein the global and local entity instances form the product instance in the database; and
        performing a global update of the globally updatable product by provisioning in the database a single updated product instance containing updated global entity instances stored in the database each associated with the users indicated to be contracted to the product.

10. The communications node of claim 9, wherein the product is a service for use on a mobile device.

11. The communications node of claim 9, wherein the entity of the product comprises one of a name, a description, an identification, a serial number, one or more links to service which the product contains the pricing for, one or more links to one or more resources for using the service, one or more prices and a link to a product offering that the entity of the product is from.

12. The communications node of claim 9, wherein an entity is eligible to be a global entity if there is an indicator indicating that the entity is a global entity or if there is a static activation period of sufficient duration associated with the entity and if the amount of personal data on the entity is less than a predetermined amount of personal data.

13. The communications node of claim 9, wherein if the globally updateable product includes one or more default entities then updating the default entities of the globally updateable product are not modified.

14. The communications node of claim 9, wherein the product, which includes one or more global entities for which a user has a contract, includes links on the contract to the database in which the global entities are stored.

15. The communications node of claim 9, wherein when saving the global entity instance of the product instance for each eligible entity of the product in the database, each global entity instance is stored with a link associated with each of the users indicated to be contracted to the product.

16. The communications node of claim 9, wherein the communications node further performs the step of:
    performing a batch update of the batch updateable product by provisioning a plurality of users' contracts with changes to the product's entities.

\* \* \* \* \*